(12) United States Patent
Balasubramanian et al.

(10) Patent No.: US 11,044,594 B2
(45) Date of Patent: Jun. 22, 2021

(54) ENHANCED PROCEDURES FOR SENDING EMERGENCY MESSAGES TO MULTIPLE MOBILE DEVICES

(71) Applicant: Apple Inc., Cupertino, CA (US)

(72) Inventors: Sanjeevi Balasubramanian, San Jose, CA (US); Shiva Krishna Narra, San Jose, CA (US); Tarik Tabet, San Jose, CA (US); Dhruv Khati, San Jose, CA (US); Lydi Smaini, San Jose, CA (US); Anjaneyulu Maganti, Cupertino, CA (US); Mohit Narang, Cupertino, CA (US); Tiberiu Muresan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/217,361

(22) Filed: Dec. 12, 2018

(65) Prior Publication Data

US 2020/0100082 A1 Mar. 26, 2020

Related U.S. Application Data

(60) Provisional application No. 62/736,777, filed on Sep. 26, 2018.

(51) Int. Cl.
| | |
|---|---|
| *H04W 4/90* | (2018.01) |
| *H04W 4/12* | (2009.01) |
| *H04L 5/00* | (2006.01) |
| *H04W 56/00* | (2009.01) |
| *H04W 52/02* | (2009.01) |
| *H04W 4/70* | (2018.01) |

(Continued)

(52) U.S. Cl.
CPC ............. *H04W 4/90* (2018.02); *H04L 1/0003* (2013.01); *H04L 5/0055* (2013.01); *H04W 4/12* (2013.01); *H04W 4/70* (2018.02); *H04W 52/0261* (2013.01); *H04W 56/001* (2013.01); *H04W 72/0446* (2013.01)

(58) Field of Classification Search
CPC ......... H04W 4/90; H04W 76/50; H04W 4/70; H04W 76/40; H04W 4/12; H04W 56/001; H04W 52/0261; H04W 72/0446; H04W 88/04; H04M 11/04; H04M 3/5116; H04M 2242/02; H04M 2242/04; H04L 5/0055; H04L 1/0003; H04L 76/50; H04L 1/189; H04L 1/08; H04L 1/1887; H04L 1/0009; Y02D 30/70
See application file for complete search history.

(56) References Cited

U.S. PATENT DOCUMENTS

| | | | | |
|---|---|---|---|---|
| 6,985,089 B2 * | 1/2006 | Liu | ...................... | G08G 1/0965 340/436 |
| 8,682,279 B2 * | 3/2014 | Rudolf | .................. | H04W 76/50 455/404.1 |

(Continued)

*Primary Examiner* — Hanh N Nguyen
(74) *Attorney, Agent, or Firm* — Kilpatrick Townsend & Stockton LLP

(57) ABSTRACT

In a method of device-to-device communication, a user device initially sends an emergency message repeatedly at a first repeating frequency. When a specified number acknowledgement (ACK) messages are received, the user device sends the emergency message repeatedly at a reduced repeating frequency. The repeating frequency may be further reduced when more ACK messages are received.

20 Claims, 14 Drawing Sheets

(51) Int. Cl.
*H04W 72/04* (2009.01)
*H04L 1/00* (2006.01)

(56) References Cited

U.S. PATENT DOCUMENTS

| | | | | |
|---|---|---|---|---|
| 9,565,518 | B2* | 2/2017 | Terrazas | H04W 24/10 |
| 9,654,956 | B2* | 5/2017 | Lim | H04W 4/90 |
| 10,142,816 | B2* | 11/2018 | Cavendish | H04W 4/90 |
| 10,856,118 | B2* | 12/2020 | Lee | H04W 84/18 |
| 2013/0301569 | A1* | 11/2013 | Wang | H04L 1/1854 |
| | | | | 370/329 |
| 2016/0169688 | A1* | 6/2016 | Kweon | G08G 1/162 |
| | | | | 701/522 |
| 2018/0270854 | A1* | 9/2018 | Lee | H04W 72/042 |
| 2019/0313231 | A1* | 10/2019 | Randolph | H04W 4/025 |

* cited by examiner

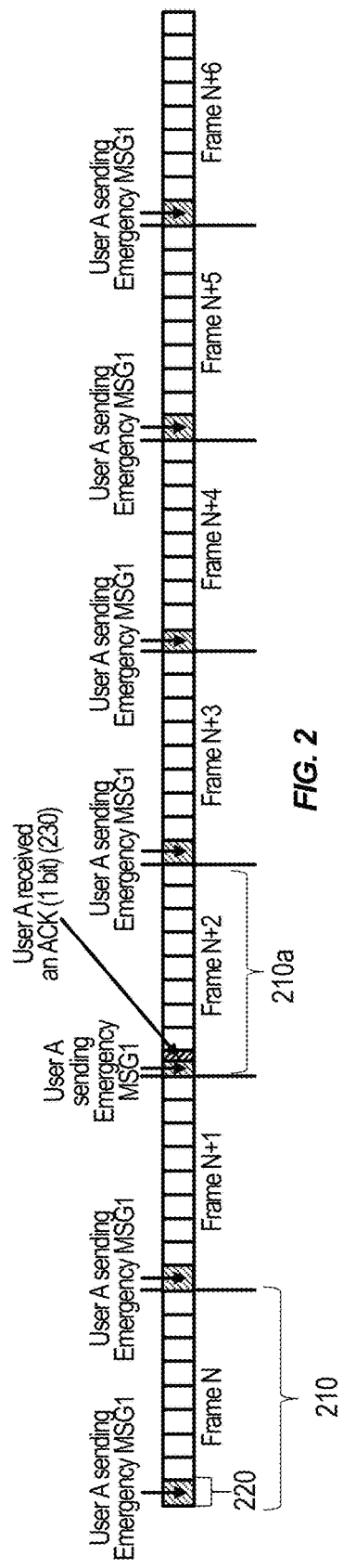
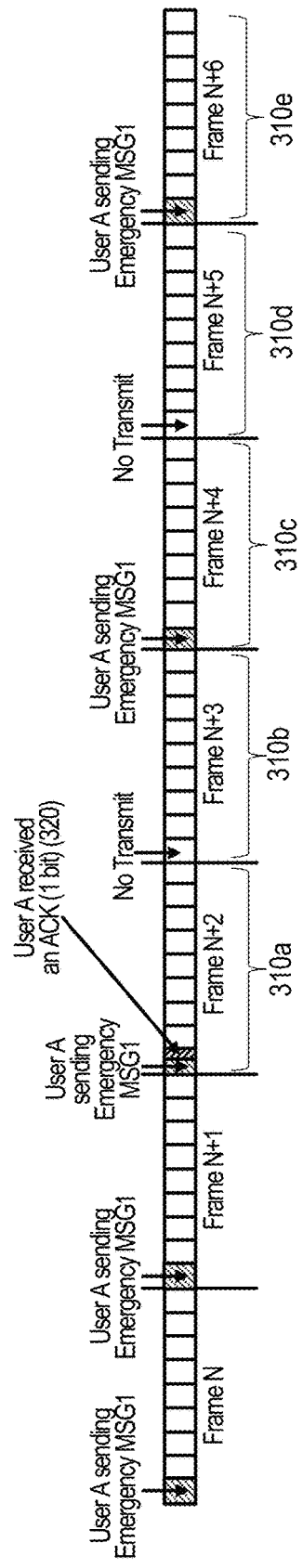
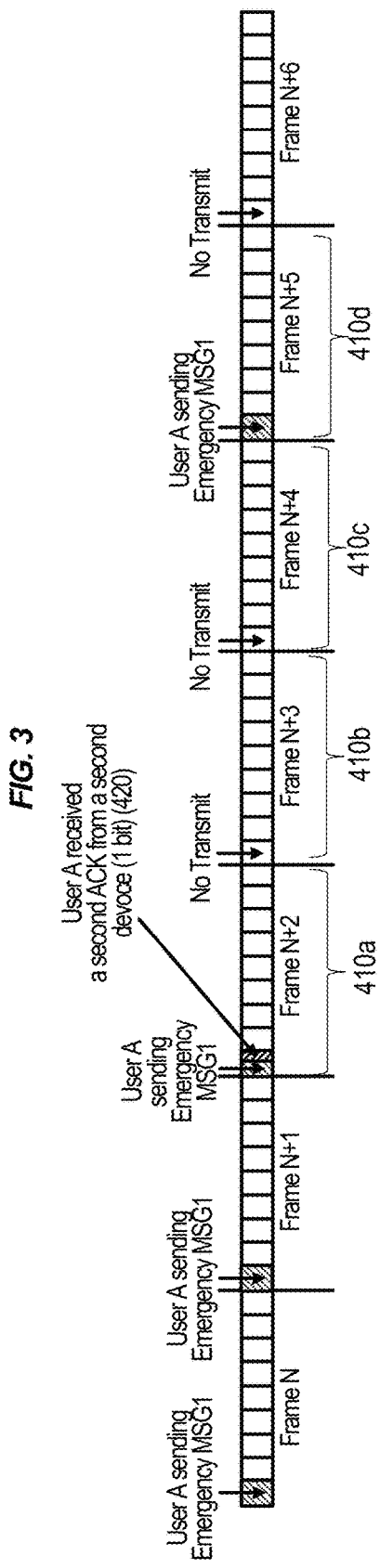
FIG. 2
FIG. 3
FIG. 4

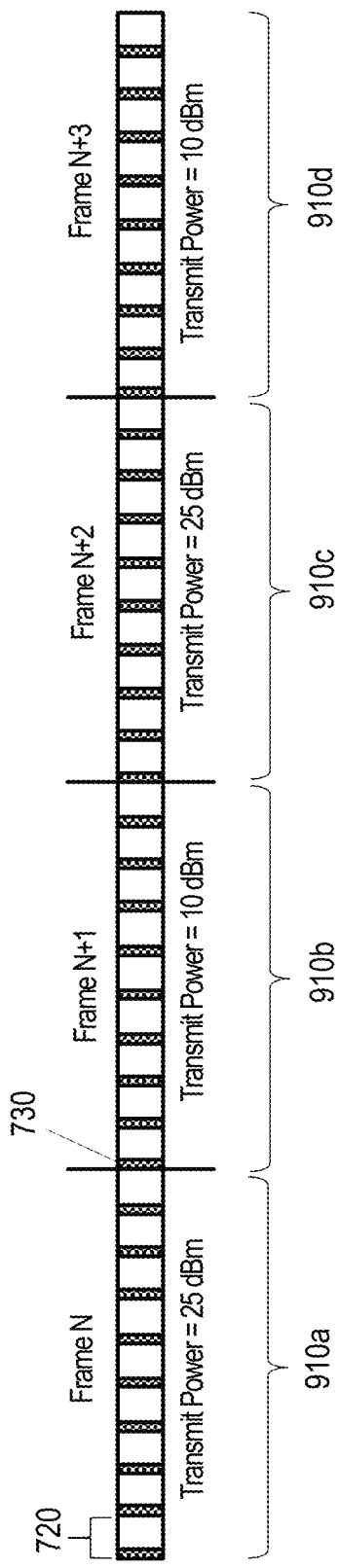
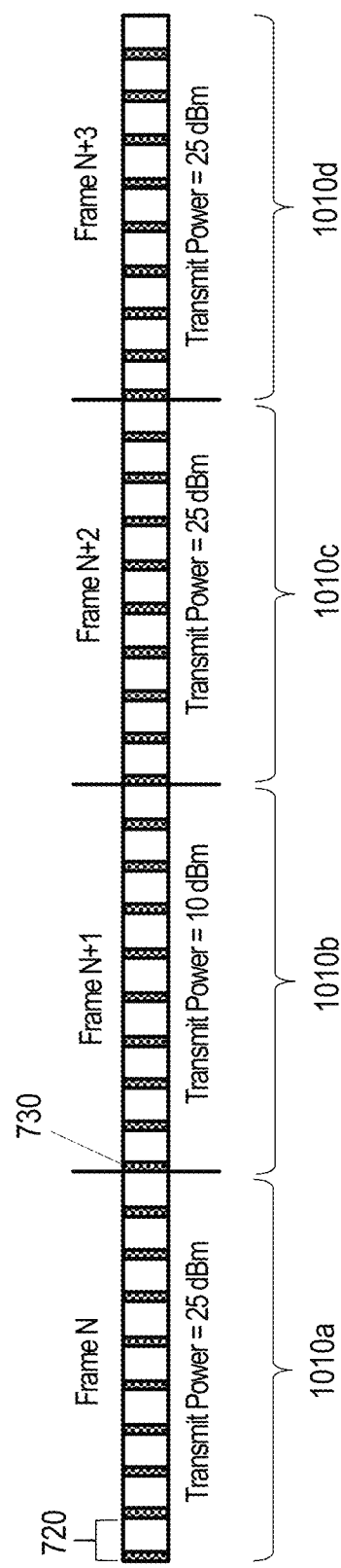

ENHANCED PROCEDURES FOR SENDING EMERGENCY MESSAGES TO MULTIPLE MOBILE DEVICES

CROSS-REFERENCES TO RELATED APPLICATIONS

This application claims the benefit of U.S. Provisional Patent Application No. 62/736,777, filed on Sep. 26, 2018, the content of which is incorporated by reference in its entirety.

BACKGROUND

Device-to-device (D2D) communication may be referred to as direct communication between two mobile devices without traversing a base station or core network (e.g., a cellular network). There are some situations in which a mobile device user may be outside of coverage areas of cellular communications. For example, a user may be hiking in the woods where there is no cellular coverage. As another example, cellular coverage may be lost in some areas, e.g., after a natural disaster. In such situations, it may be desirable for a mobile device, such as a smart phone, to communicate with other mobile devices in a D2D communication network. For example, in an emergency situation (e.g., an injury during hiking), a user may want to be able to send out emergency signals to people who are near. As another example, in a natural disaster (e.g., a hurricane), it may be advantageous to be able to send out messages to a large group of mobile device users in order to coordinate evacuation or rescue efforts. In some situations, D2D communication may be preferred even if there is cellular coverage. For example, in a sports stadium or in a mall, the cellular signals may be congested. A user may want to turn off cellular communication, and instead communicate with friends using D2D communication. Therefore, there is a need to improved methods of D2D communications.

SUMMARY

According to some embodiments, in a method of device-to-device communication, a user device can initially send an emergency message at a first repeating frequency. When a specified number of acknowledgement (ACK) messages are received, the user device can send the emergency message at a reduced repeating frequency. The repeating frequency may be further reduced, e.g., when more ACK messages are received.

According to some embodiments, a method can provide for efficiently handling the transport block and modulation coding scheme (MCS). When one or more negative acknowledgement (NACK) messages are received, a primary device can resend the transport block at a lower MCS value. This may make the D2D communication more reliable in low coverage conditions.

According to some embodiments, a method of device-to-device (D2D) communication includes, by a first mobile device, sending a request to a second mobile device for transmitting data to the second mobile device; receiving a first modulation coding scheme (MCS) value and a first transport block size from the second mobile device; transmitting, in one or more first frames, the data in a transport block having the first transport block size to the second mobile device using the first MCS value; receiving a specified number of negative acknowledgement (NACK) messages from the second mobile device in response to transmitting the data in the one more first frames; receiving a second MCS value that is lower than the first MCS value from the second mobile device for use in retransmitting the data; and retransmitting the data to the second mobile device in one or more second frames using the second MCS value. In some embodiments, the request includes a buffer status report (BSR). In some embodiments, the second MCS value is determined based on at least one of a reference signal received power (RSRP) value or a signal-to-interference-noise-ratio (SINR) value measured during the one or more first frames. In some embodiments, the specified number of NACK messages may be two. In some embodiments, the method further includes receiving a second NACK message in response to transmitting the data in the one or more second frames; receiving a third MCS value that is lower than the second MCS value from the second mobile device; and retransmitting the data to the second mobile device in at least one third frame using the third MCS value.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 2 illustrates an exemplary frame sequence for broadcasting emergency messages according to some embodiments.

FIG. 3 illustrates an exemplary frame sequence for broadcasting emergency messages according to some embodiments.

FIG. 4 illustrates an exemplary frame sequence for broadcasting emergency messages according to some embodiments.

FIG. 9 illustrates another exemplary frame sequence for sending synchronization signals in a non-emergency situation according to some embodiments.

FIG. 10 illustrates yet another exemplary frame sequence for sending synchronization signals in a non-emergency situation according to some embodiments.

DETAILED DESCRIPTION

I. Sending Emergency Messages to Many Devices

In an emergency, a user may want to use a mobile device to send emergency messages to other, e.g., a large number of, user devices in the vicinity via D2D communications in order to get help. In normal situations, a user device may keep a "friends list" as a pre-populated list of devices with which the user device may wish to exchange messages. Under routine conditions, the user device may not want to send messages to or receive messages from random people.

However, in emergency situations, the user device may wish to send emergency messages to any or all devices in the vicinity, not just those that are on the friends list. A receiving device may respond by sending an acknowledgement (ACK) message. It is possible that there may be a large number of devices in the vicinity receiving and responding to the emergency messages. Reception of multiple ACK messages with an entire payload (e.g., 32 bits) may lead to usage of a large amount of resources (e.g., draining the battery), and may also lead to collisions as the medium may become congested. The continuing transmission of emergency messages at a high rate can also use a large amount of resources, e.g., battery and the medium.

According to some embodiments, enhanced procedures of sending emergency messages using D2D communications are provided that may alleviate collisions and reduce overhead. The D2D communications may be considered in a primary-secondary relationship. In computer networking, primary-secondary (also referred to as master-slave) is a model for a communication protocol in which one device (referred to as primary or master) controls the communication with one or more other devices (referred to as secondary or slave devices). Once the primary-secondary relationship is established, the direction of control is from the primary device to the secondary device(s).

An alternative radio service (ARS) is one type of radio access technology (RAT) for D2D communication. The D2D communications may include text messages as well as voice messages. The communication range can be as far as several tens of kilometers. An ARS may operate in any unlicensed frequency or frequencies, such as 900 MHz, 2.4 GHz, 5 GHz, or the like. Different countries may have different unlicensed frequency bands.

A. Automatically Reducing Frequency of Sending Emergency Messages

Figure 1:
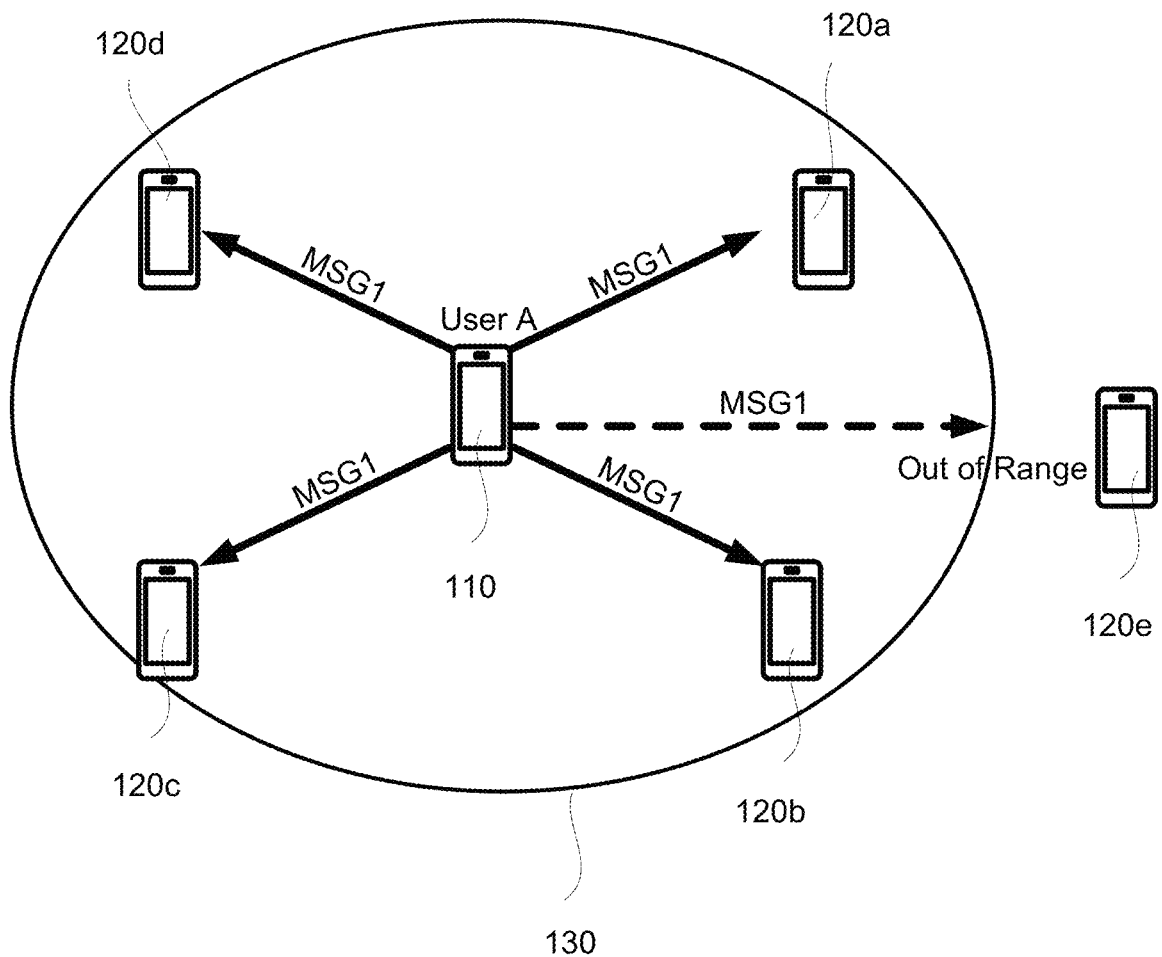
FIG. 1 illustrates schematically an example device-to-device (D2D) communication group involving a primary device and multiple secondary devices.

FIG. 1 illustrates a device-to-device (D2D) communication group involving a primary device (referred to as user equipment or UE) UE A 110 and multiple secondary devices 120a-120e. The primary device 110 may send synchronization signals to the secondary devices 120a-120e to facilitate D2D communication sessions. Global navigation satellite systems (GNSS) signals, such as the global positioning system (GPS) signals, can be an important aspect of D2D communications, as it may be important for the secondary devices 120 to know the exact location of the primary device 110 and the exact time when the primary device 110 broadcast a message. For example, in case of an emergency, the primary device 110 may broadcast an emergency message to all secondary devices 120 within a communication range of the primary device 110 (e.g., within the circle 130 around the primary device 110; note that the secondary device 120e may be out of the communication range of the primary device 110 as it may be too far from the primary device 110).

A secondary device 120 receiving the emergency message may need to know the location of the primary device 110 in order to provide help. The secondary device 120 may also need to know the time when the emergency message was sent, e.g., in order to determine whether the emergency message is still relevant, to determine whether the transmitting device may have moved, etc. The position information and timing information can be important in other situations. The primary device 110 may maintain position fixes (e.g., in terms of longitude and latitude) and time through satellite signals. The secondary devices may not have position fixes directly through satellite signals.

The communications between the devices can be implemented using frames. A frame can refer to a digital data transmission unit in computer networking and telecommunication. A frame typically includes frame synchronization features comprising of a sequence of bits or symbols that indicate to the receiver, the beginning and end of the payload data within the stream of symbols or bits it receives.

FIG. 2 illustrates an exemplary frame sequence for broadcasting emergency messages according to some embodiments. A frame 210 may include a number of slots 220 (e.g., 9 slots). A frame 210 may be, for example, 342 ms long. A slot 220 may be, for example, 38 ms long. A beginning portion of a slot (e.g., the initial 5 ms of the slot) may be designated for synchronization signals. In some embodiments, the first slot 220 in a frame 210 may be designated for discovery messages and/or emergency messages. The second slot of a frame may be designated for transmitting device control signals. The third slot of a frame may be designated for receiving device control signals.

In emergencies, the first slot 220a of a frame 210 may indicate an emergency, e.g., via a flag. In some embodiments, a user device (acting as a primary device, such as UE A 110 illustrated in FIG. 1) may broadcast emergency messages continuously, e.g., in every frame, as illustrated in FIG. 2, to all nearby secondary devices 120. UE A 110 may receive an acknowledgement (ACK) message 230 from one of the secondary devices 120 in a frame (e.g., the frame 210a). In a conventional procedure, UE A 110 may continue to broadcast emergency messages frequently, e.g., in every frame, after receiving the ACK message 230, as illustrated in FIG. 2.

It is possible that there may be a large number of devices in the vicinity, receiving and responding to the emergency messages. Reception of multiple ACK messages having an entire payload (e.g., 32 bits) may be inefficient, e.g., leading to consumption of a large amount of resources (e.g., draining the battery) and causing collisions. Continuing to transmit emergency messages at a high rate can also use a large amount of resources.

FIG. 3 illustrates an exemplary frame sequence for broadcasting emergency messages according to some embodiments. As UE A 110 receives ACK messages from one or more devices 120, UE A 110 may dynamically and automatically reduce the frequency of broadcasting emergency messages, e.g., based on the number of ACK messages received. For example, as illustrated in FIG. 3, UE A 110 receives an ACK message 320 from a first secondary device 120 (e.g., from the secondary device 120a) in the frame 310a. In response to receiving the ACK message 320, UE A 110 may reduce the frequency of broadcasting emergency messages in subsequent frames. For example, UE A 110 may broadcast emergency messages in every other frame or at an even lower rate (e.g., only in frames 310c and 310e, and skipping frames 310b and 310d, as illustrated in FIG. 3), instead of in every frame. Since UE A 110 already received one ACK message, emergency messages may not need to be broadcasted as frequently as help may be already on the way. By broadcasting emergency messages less frequently, the chance of collisions may be reduced. Also, battery power may be better preserved by broadcasting emergency messages less frequently, e.g., extending the period over which emergency messages can be broadcast.

FIG. 4 illustrates an exemplary frame sequence for broadcasting emergency messages according to some embodiments. As illustrated, UE A 110 receives a second ACK message 420 from a second secondary device 120 (e.g., from the secondary device 120b) in the frame 410a. In response to receiving the second ACK message 420, UE A 110 may further reduce the frequency of broadcasting emergency messages in subsequent frames. For example, UE A 110 may send emergency messages in only one out of three consecutive frames (e.g., skipping the frames 410b and 410c before broadcasting in the frame 410d, as illustrated in FIG. 4). As more ACK messages are received, UE A 110 may further reduce the frequency of broadcasting the emergency messages. It should be understood that FIGS. 3 and 4 only illustrate some exemplary frame sequences according some embodiments of the enhanced procedures for sending emergency messages. Other frame sequences are also possible according to some other embodiments.

B. Acknowledgement Messages with Reduced Payload Capacity

A full payload capacity of an emergency message may include, for example, 32 bits. Table 1 shows an exemplary payload of a 32-bit emergency reply message according to some embodiments.

TABLE 1

Exemplary payload of a 32-bit emergency reply message.

| Field # | Field Name | Bit Size | Description |
|---|---|---|---|
| 1 | MSG(1)/MSG(2) | 1 | Message type indicator: MSG(1) = 0; MSG(2) = 1 |
| 2 | Emergency Indicator | 1 | Non-emergency = 0; emergency = 1 |
| 3 | Discovery Type | 1 | 0 indicates 1-to-1 (dedicated) discovery |
| 4 | Relay Indication | 1 | Indicate sender's relaying capability |
| 5 | ARS Version | 2 | Indicates ARS version |
| 6 | Reserved | 1 | Reserved for future features |
| 7 | MSG(2) Tx Power Indication | 4 | For the MSG(2) payload, these bits are reutilized to send information about the discovery replier (DR) transmission power level |
| 8 | Random Challenge | 3 | Random number to ensure the anonymity of the device ID and prevent tracking. |
| 9 | Hash of the ID, random challenge and message payload | 18 | HDR is the 18 bit output of the keyed hash function MAC(K, mDR), where: K = MAC(KDI, DR, SD(rDI, rDR, n)) - Precomputation of key KDI, DR - Temporary identifier of the pair DI and DR rDI - Random challenge present in field (7) of the associated MSG(1) concatenated with 6 bits encoding of randomly selected logical subcarrier kMSG(1). rDR - Random challenge present in field (8) concatenated with 6 bits encoding of randomly selected logical subcarrier kMS(2). n - The SFN mDR - Concatenation of the payload fields (1)//(2)//(3)//(4)//(5)//(6)//(7) |
| 10 | CRC (cyclic redundancy check) | 0 | The CRC is not transmitted, the hash ID is used instead for integrity protection |

According to some embodiments, in response to receiving an emergency message, a secondary device 120 may send an ACK message with only one bit, instead of sending an entire payload (e.g., 32 bits) of a regular reply message. This may reduce the probability of collisions and overhead, e.g., when a large number of secondary devices 120 respond to the emergency message. The remaining payload (e.g., of the full 32-bit message) can be sent in a later frame. The ACK message may serve as a quick "shout" to UE A 110 that another device is present and received the message. Using the quick "shout" may reduce the chances of multiple devices "shouting" at the same time (hence a "collision").

In some embodiments, the ACK message may include a Zadoff-Chu (ZC) sequence, e.g., similar to a narrowband Internet of Things (NB-IoT) physical random access channel (NPRACH)). A ZC sequence is a complex-valued mathematical sequence which, when applied to radio signals, gives rise to an electromagnetic signal of constant amplitude. A ZC sequence has the useful property that cyclically shifted versions of the sequence imposed on a signal result in zero correlation with one another at the receiver. In such cases, even when a collision occurs (e.g., when multiple devices 120 transmit ACK messages at the same time and from the same location), UE A 110 may still be able to decode the ACK messages.

C. Method of Broadcasting Emergency Messages via D2D Communication

Figure 5:
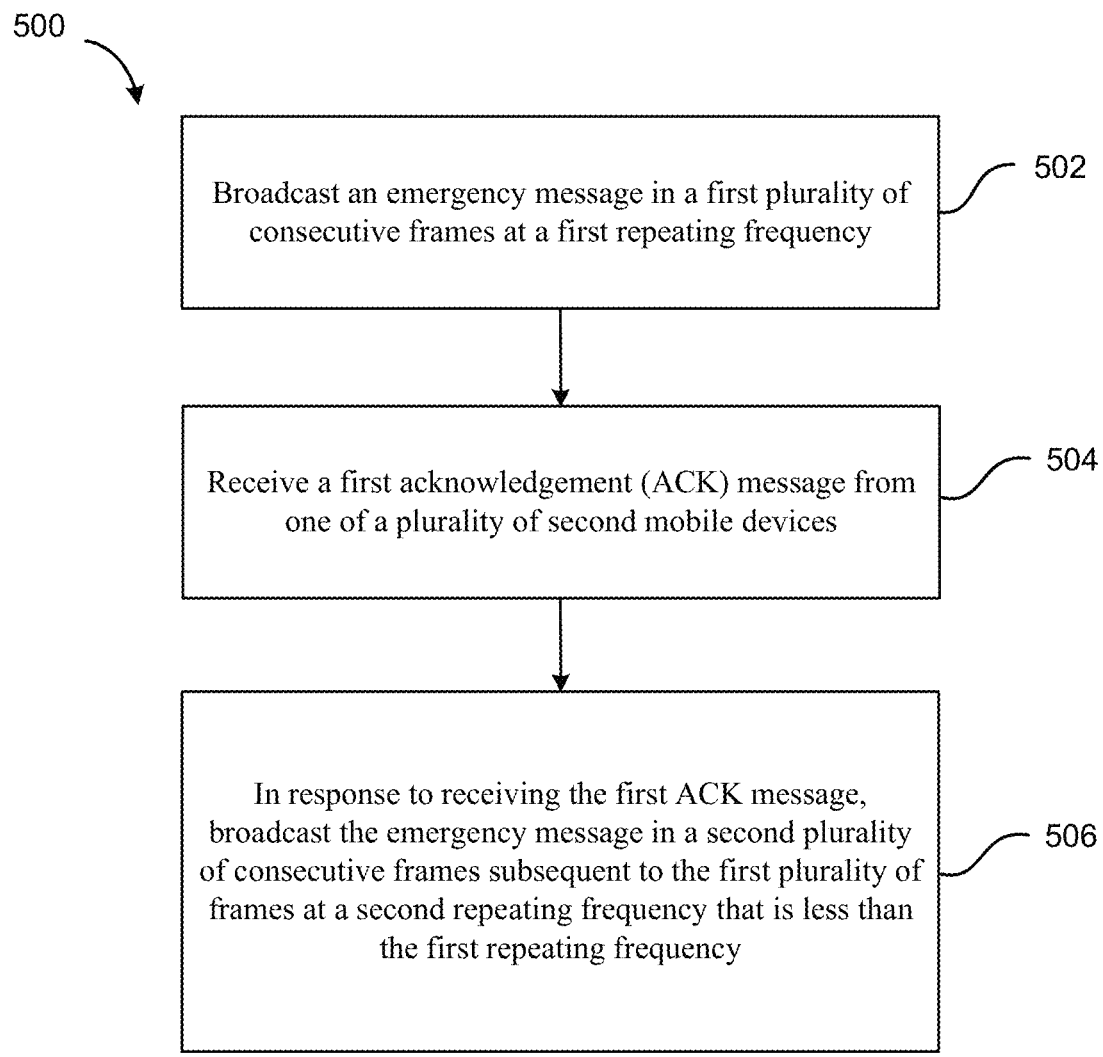
FIG. 5 is a flowchart illustrating a method of broadcasting emergency messages via D2D communication according to some embodiments.

FIG. 5 is a flowchart illustrating an example method 500 of broadcasting emergency messages via D2D communication according to some embodiments. Method 500 may be performed by a mobile device (e.g., a smart phone) that can communication with other mobile devices.

At 502, a first mobile device broadcasts an emergency message in a first plurality of consecutive frames at a first repeating frequency. In some embodiments, broadcasting the emergency message at the first repeating frequency may include broadcasting the emergency message in every frame of the first plurality of consecutive frames, as illustrated in FIG. 2. In some other embodiments, broadcasting the emergency message at the first repeating frequency may include broadcasting the emergency message, e.g., in every other frame of the first plurality of consecutive frames, or in two frames out of every three consecutive frames, or the like. In response to the emergency message, the first mobile device may receive one or more ACK messages from one or more of the plurality of second mobile devices.

At 504, the first mobile device receives a first acknowledgement (ACK) message from one of a plurality of second mobile devices.

At 506, in response to receiving the first ACK message, the first mobile device broadcasts the emergency message in a second plurality of consecutive frames subsequent to the first plurality of frames at a second repeating frequency that is less than the first repeating frequency. For example, in cases in which broadcasting the emergency message at the first repeating frequency includes broadcasting the emergency message in every frame of the first plurality of consecutive frames, as illustrated in FIG. 2, broadcasting the emergency message at the second repeating frequency may include broadcasting the emergency message, e.g., in every other frame as illustrated in FIG. 3, or in one frame out of every three consecutive frames as illustrated in FIG. 4, etc. Other repeating frequencies are also possible.

It should be appreciated that the specific steps illustrated in FIG. 5 provide a particular method of broadcasting emergency messages via D2D communication according to some embodiments. Other sequences of steps may also be performed according to alternative embodiments. For example, alternative embodiments of the present disclosure may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

II. Adaptive Transmit Power for Efficient Battery Power Management

In a D2D communication group, such as that illustrated in FIG. 1, a primary device UE A 110 may repeatedly send synchronization signals (which may include frequency and timing information) and discovery messages at fixed time intervals to multiple secondary devices 120 at a default transmit power. Although the default transmit power may provide a greater communication range, and thus greater likelihood that another device will detect the signal, higher transmit powers may result in higher battery power usage.

Figure 6:
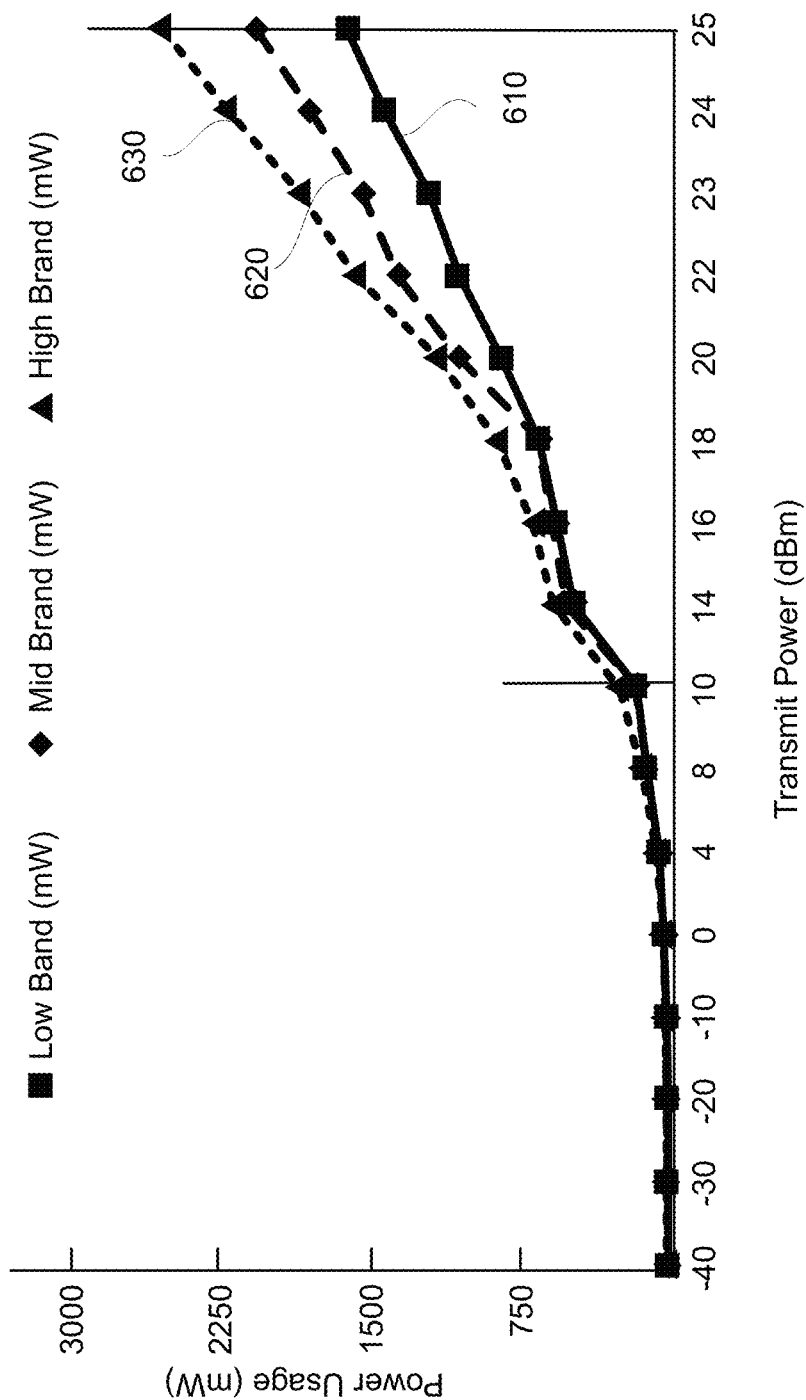
FIG. 6 shows some exemplary plots of power usages as a function of transmit power, for various frequency band groups (e.g., a low frequency band group, a medium frequency band group, and a high frequency band group, respectively, according to some embodiments.

FIG. 6 shows some exemplary plots 610, 620, and 630 of power usage as a function of transmit power, for various frequency band groups (e.g., a low frequency band group represented by square symbols, a medium frequency band group represented by diamond symbols, and a high frequency band group represented by triangle symbols, respectively). As illustrated in FIG. 6, the power usage may increase exponentially for increasing transmit powers beyond the transmit power level of about 10 dBm for all frequency band groups. Therefore, if the transmit power is kept below about 10 dBm, power usage may be kept relatively low.

According to some embodiments, a battery power management method may loop the transmit power for sending synchronization signals and discovery messages between a default power value and a reduced power value in consecutive frames when a low battery condition is detected in one or more devices in a D2D communication group, thereby conserving the battery power.

A. Non-Emergency Situations

Figure 7:
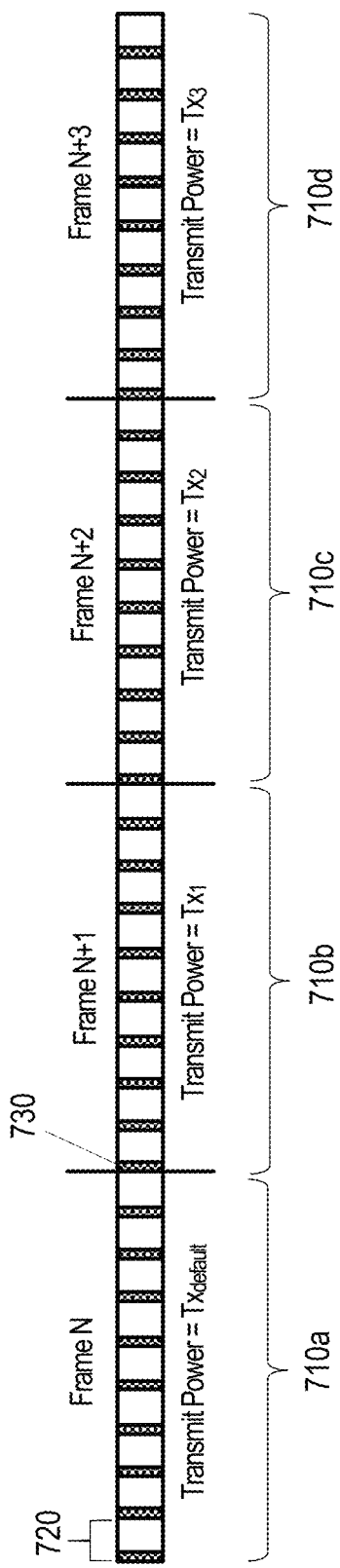
FIG. 7 illustrates an exemplary frame sequence for sending synchronization signals in a non-emergency situation according to some embodiments.

FIG. 7 illustrates an exemplary frame sequence for sending synchronization signals in a non-emergency situation according to some embodiments. As illustrated, a frame 710 may include a plurality of slots 720 (e.g., 9 slots). A first portion 730 (e.g., the first bit) of a slot 720 may be designated for synchronization signals. Different frames can use different power levels for the synchronization signal. In this example, the transmit power may loop through a sequence of high-low-low-low power values for the synchronization signal in consecutive frames. For example, as illustrated in FIG. 7, the synchronization signals may be transmitted at a default power value $Tx_{default}$ for the frame 710a, and at reduced power values $Tx_1$, $Tx_2$, and $Tx_3$, for the three subsequent frames 710b, 710c, and 710d, respectively. $Tx_1$, $Tx_2$, and $Tx_3$ may have the same value, or many have different values according to various embodiments. The sequence can be repeated in later frames.

For example, the default power value $Tx_{default}$ may be 25 dBm, and the reduced power value $Tx_1$, $Tx_2$, and $Tx_3$ may be 10 dBm. Referring to FIG. 6, based on the power usage curve 620 as a function of transmit power for a mid-frequency band group, the power usage at a 25 dBm transmit power may be about 2,071 mW, whereas the power usage at a 10 dBm transmit power may be only about 167 mW, which is about one twelfth of 2,071 mW.

Thus, in the exemplary frame sequence illustrated in FIG. 7, assuming that $Tx_{default}=25$ dBm and $Tx_1=Tx_2=Tx_3=10$ dBm, the total power usage for the four frames 710a-710d may be equal to approximately 2,071+167+167+167=2,572 mW, giving rise to an average power usage per frame of about 643 mW. In contrast, if the transmit power is 25 dBm for every frame, the average power usage per frame would be about 2,071 mW, which is about 3.2 times the 643 mW used for the previous sequence. Therefore, a power saving factor of about 3.2 may be realized by looping the transmit power through the sequence of high-low-low-low, as illustrated in FIG. 7.

As radio signals travel through space, signal strengths may be attenuated due to free space path loss. Thus, at certain distance sufficiently far away from a transmitting device, the received power at a receiving device may be below the detection limit of the receiving device. Also, the signal-to-interference-noise-ratio (SINR) may also decrease as the distance from the transmitting device increases, causing communications to be less reliable. Therefore, there may be a limited communication range for a given transmit power. In general, a higher transmit power may have a greater communication range (at the cost of increased power consumption).

Figure 8:
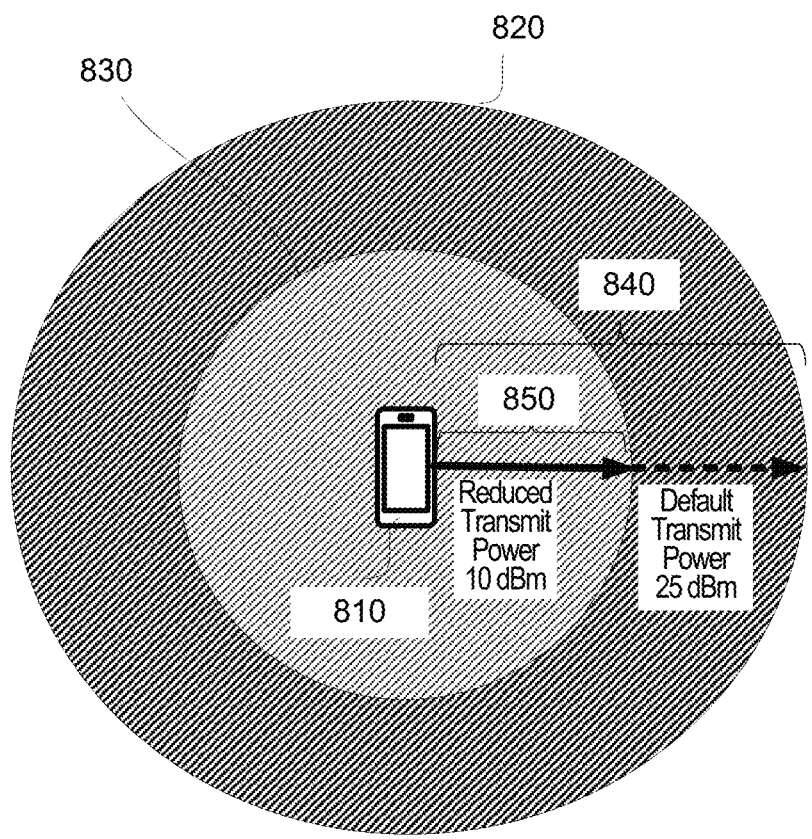
FIG. 8 illustrates example communication ranges for different transmit powers according to some embodiments.

FIG. 8 illustrates schematically communication ranges for different transmit powers according to some embodiments. At a default transmit power of 25 dBm, the communication range may extend to a first circle 820 with a first radius 840 from the primary device 810. (It is noted that the coverage pattern may not be circular and different implementations can have different shapes.) At a reduced transmit power of 10 dBm, the communication range may extend to a second circle 830 with a second radius 850 that is less than the first radius 840.

Thus, in the exemplary frame sequence illustrated in FIG. 7, the communication range may be longer for the frame 710a, and shorter for the subsequent three frames 710b-710d. Thus, the synchronization signals sent by the primary device 810 may still reach a longer range, albeit less frequently (e.g., only in one frame out of four consecutive frames), while power usage is significantly reduced (e.g., by a power saving factor of about 3.2). In some embodiments, each frame may be about 342 ms long. Therefore, the fact that synchronization signals may reach the longer range (e.g., extending to the first circle 820 with the first radius 840) only in one frame out of two or more consecutive frames may not be a functional limitation, while the savings in the power usage may be significant. This may be especially advantageous when the battery power of the primary device 810 is relatively low, as the operating time can be extended.

Other frame sequences may also be used. FIG. 9 illustrates another exemplary frame sequence for sending synchronization signals in a non-emergency situation according to some embodiments. In this example, the transmit power alternates between a default power value of 25 dBm and a reduced power value of 10 dBm in consecutive frames 910a-910d (e.g., in a high-low-high-low sequence). The average power usage per frame in this example may be about (2,071+643)/2=1,357 mW. Thus, a power saving factor of about 1.5 may be realized compared to the case where the default transmit power is 25 dBm in every frame.

FIG. 10 illustrates yet another exemplary frame sequence for sending synchronization signals in a non-emergency situation according to some embodiments. In this example, the transmit power may loop through a high-low-high-high sequence. Assuming that the default power value is 25 dBm and the reduced power value is 10 dBm, the average power usage per frame in this example may be about (2,071×3+643)/4=1,714 mW. This may provide a power saving factor of about 1.2 compared to the case where the default transmit power is 25 dBm in every frame.

In some embodiments, the duty cycle of the default power value of a frame sequence may be dynamically adjusted based on the battery power level. The duty cycle may be defined as the fraction of frames in a sequence of consecutive frames for which the default power value is used. For example, at or above a first battery threshold, a relatively high duty cycle may be used (e.g., in high-low-high-high sequence illustrated in FIG. 10, where the duty cycle is ¾). When the battery power reaches a lower second battery threshold, the duty cycle may be decreased (e.g., in a high-low-high-low sequence illustrated in FIG. 9, where the duty cycle is ½). When the battery power reaches an even lower third battery threshold, the duty cycle may be still further reduced (e.g., in the high-low-low-low sequence illustrated in FIG. 7, where the duty cycle is ¼).

In some embodiments, the battery power management method may be manually activated by a user, even in situations where the battery power is not at or below an initial low battery threshold. For example, if a user is in a situation where battery charging will not be available for an extended period of time (e.g., 48 hours). The user may want to conserve battery power by manually switching to a power saving mode, for example by manually entering the mode through a settings menu.

Figure 11:
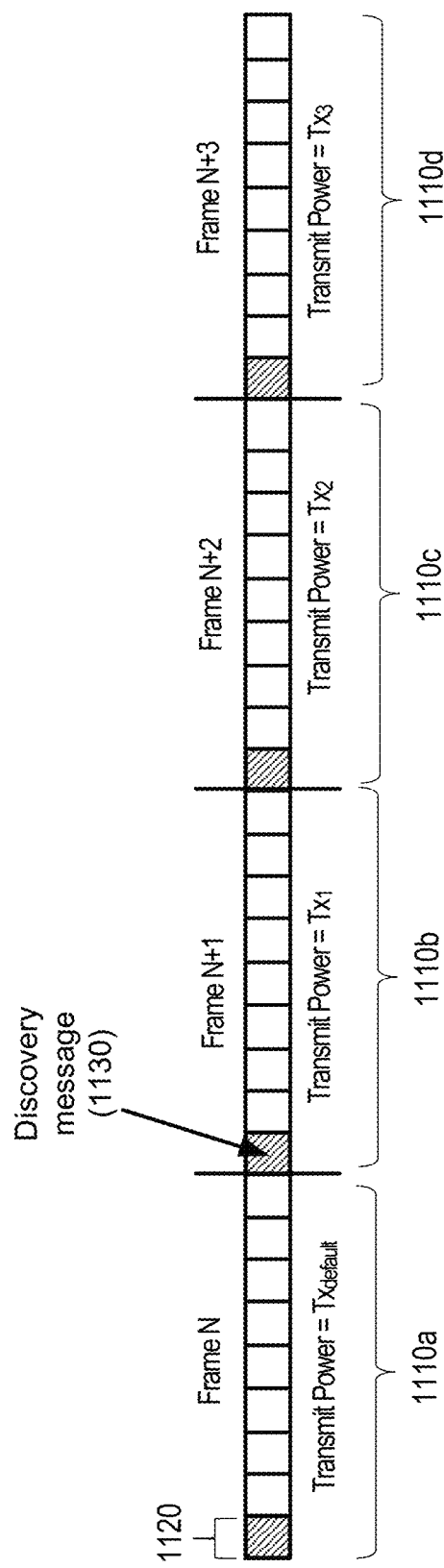
FIG. 11 illustrates an exemplary frame sequence for sending discovery messages according to some embodiments.

The battery power management method may also be used when sending discovery messages in non-emergency situations. FIG. 11 illustrates an exemplary frame sequence for sending discovery messages according to some embodiments. Discovery messages 1130 are usually sent in a first slot 1120 of a frame 1110. In this example, the discovery messages 1130 may be transmitted at a default power value $Tx_{default}$ for the frame 710a, and at reduced power values $Tx_1$, $Tx_2$, and $Tx_3$, for the three subsequent frames 1110b, 1110c, and 1110d, respectively. $Tx_1$, $Tx_2$, and $Tx_3$ may have the same value, or may have different values according to various embodiments. The sequence is then repeated. In other implementations, the pattern can be implemented for a different number of frames, such as two, three, five, ten, etc. Similar to the example illustrated in FIG. 7, assuming that the default power value is 25 dBm, and the reduced power value $Tx_1$, $Tx_2$, and $Tx_3$ is 10 dBm, a power saving factor of about 3.2 may be realized by looping the transmit power through the sequence of frames, as compared to transmitting the discovery messages at the default power value in every frame. As discussed above in relation to FIG. 8, the communication range may be longer for those frames transmitted at the default power value, and shorter for those frames transmitted at the reduced power value. But the discovery messages may still reach the longer range, albeit less frequently (e.g., only in one frame out of four consecutive frames), while power usage is significantly reduced (e.g., by a power saving factor of about 3.2).

B. Emergency situations

Figure 12:
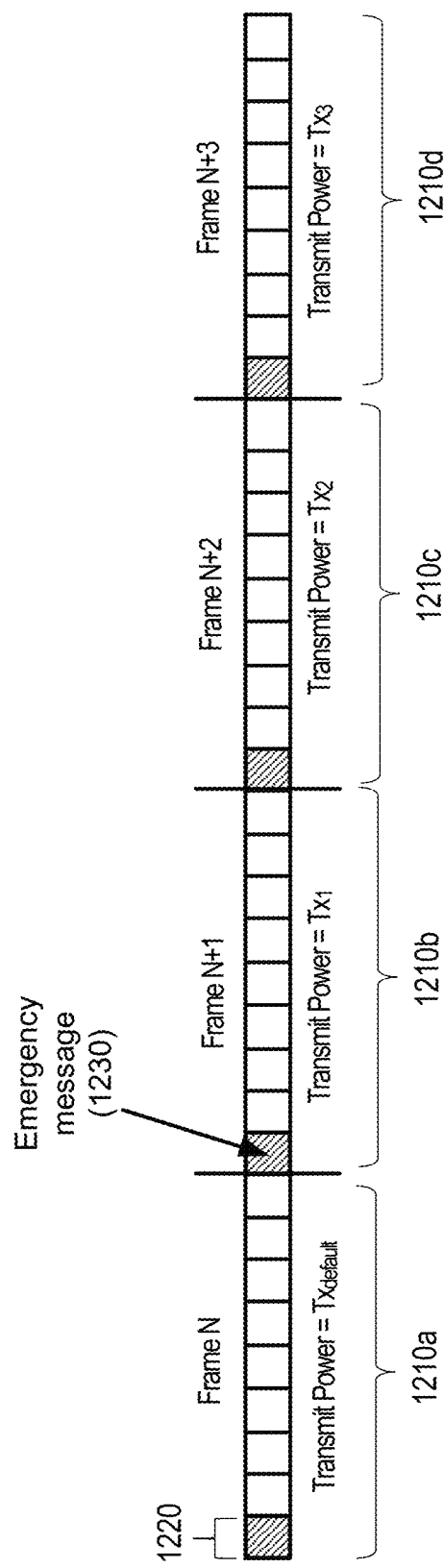
FIG. 12 illustrates an exemplary frame sequence for sending emergency messages according to some embodiments.

The battery power management method may also be used for sending emergency messages. FIG. 12 illustrates an exemplary frame sequence for sending emergency messages according to some embodiments. Emergency messages 1230 can be sent in a first slot 1220 of a frame 1210. In this example, the emergency messages 1230 may be transmitted at a default power value $Ts_{default}$ for the frame 1210a, and at reduced power values $Tx_1$, $Tx_2$, and $Tx_3$, for the three subsequent frames 1210b, 1210c, and 1210d, respectively. $Tx_1$, $Tx_2$, and $Tx_3$ may have the same value, or many have different values according to various embodiments. The sequence is then repeated. Similar to the example illustrated in FIG. 11, assuming that the default power value is 25 dBm, and the reduced power value $Tx_1$, $Tx_2$, and $Tx_3$ is 10 dBm, a power saving factor of about 3.2 may be realized by looping the transmit power through the sequence of frames, as compared to transmitting the discovery messages at the default power value in every frame.

As discussed above in relation to FIG. 8, the communication range may be longer for those frames transmitted at the default power value, and shorter for those frames transmitted at the reduced power value. But the emergency messages may still reach the longer range, albeit less frequently (e.g., only in one frame out of four consecutive frames), while power usage is significantly reduced (e.g., by a power saving factor of about 3.2).

C. Method of D2D Communication

Figure 13:
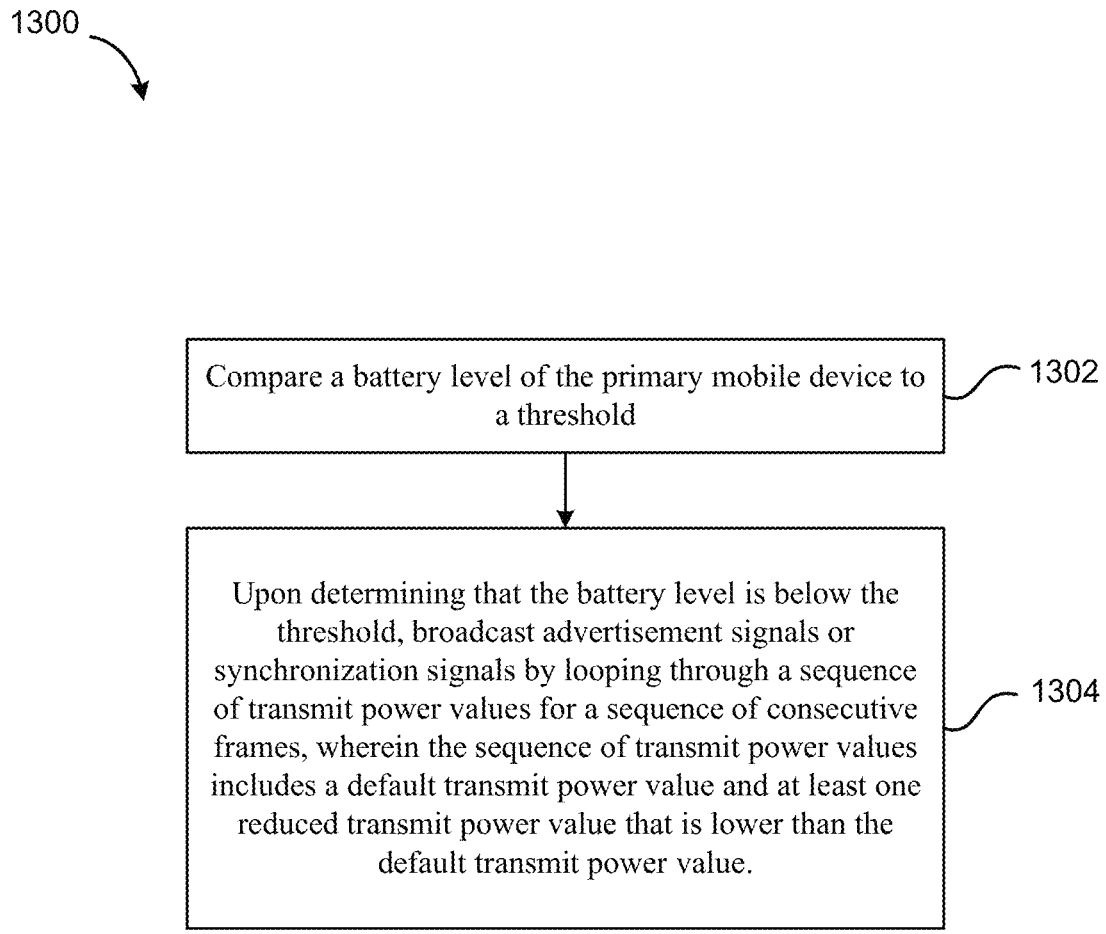
FIG. 13 is a flowchart illustrating an example method of D2D communication according to some embodiments.

FIG. 13 is a flowchart illustrating a method of D2D communication according to some embodiments.

At 1302, a primary device compares a battery level of the primary mobile device to a threshold. The threshold may be predetermined or preset.

At 1304, upon determining that the battery level is below the threshold, the primary device broadcasts advertisement signals or synchronization signals by looping through a sequence of transmit power values for a sequence of consecutive frames. The sequence of transmit power values includes a default power value and at least one reduced power value that is lower than the default power value. For example, the looping of the sequence of transmit power values may be similar to those illustrated in FIGS. 9-11.

It should be appreciated that the specific steps illustrated in FIG. 13 provide a particular method of D2D communication according to some embodiments. Other sequences of steps may also be performed according to alternative embodiments. For example, alternative embodiments of the present disclosure may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Adaptive Modulation Coding Scheme in Low Coverage

A. Modulation Coding Scheme and Transport Block Size

A vast amount of information is communicated wirelessly using radio communication systems. One of the fundamental aspects of radio communication systems is modulation. Modulation relates to how information is superimposed on a radio carrier, so that the information can be transmitted from one place to another via the radio carrier. Examples of modulation methods include amplitude modulation (AM), frequency modulation (FM), phase modulation (PM), phase shift keying (PSK), and the like, as well as modulation combinations such as quadrature amplitude modulation (QAM), quadrature PSK (QPSK), and the like. In QAM, amplitude and phase information are used to carry the signal. Data is modulated onto in-phase and quadrature elements of a signal: I and Q, and the constellation forms a number of points in the two planes. PSK conveys data by changing the phase of a constant frequency reference signal (the carrier wave). QPSK is a form of PSK in which two bits are modulated at once, selecting one of four possible carrier phase shifts (0, 90, 180, or 270 degrees).

Various modulation schemes and coding rates are defined by standards and may be represented by a modulation coding scheme (MCS) index value. MCS defines the modulation (e.g., QPSK, 16 QAM, 64 QAM, 256 QAM) and coding rate (e.g., ½, ¾, ⅔) to be used in a communication. In general, the higher the MCS, the faster the data rate. On the other hand, decoding may be more difficult as the MCS increases. A transport block is data from an upper layer given to the physical layer to be transmitted in each transmission time interval. The transport block size may be determined based on MCS and the number of physical resource blocks. In general, the higher the MCS, the larger the transport block size.

As discussed above, as radio signals travel through space, signal strengths may be attenuated due to free space path loss. Thus, the SINR may decrease as the distance from the transmitting device increases, causing communications to be less reliable. The SINR may be an indication of a coverage condition.

Figure 14:
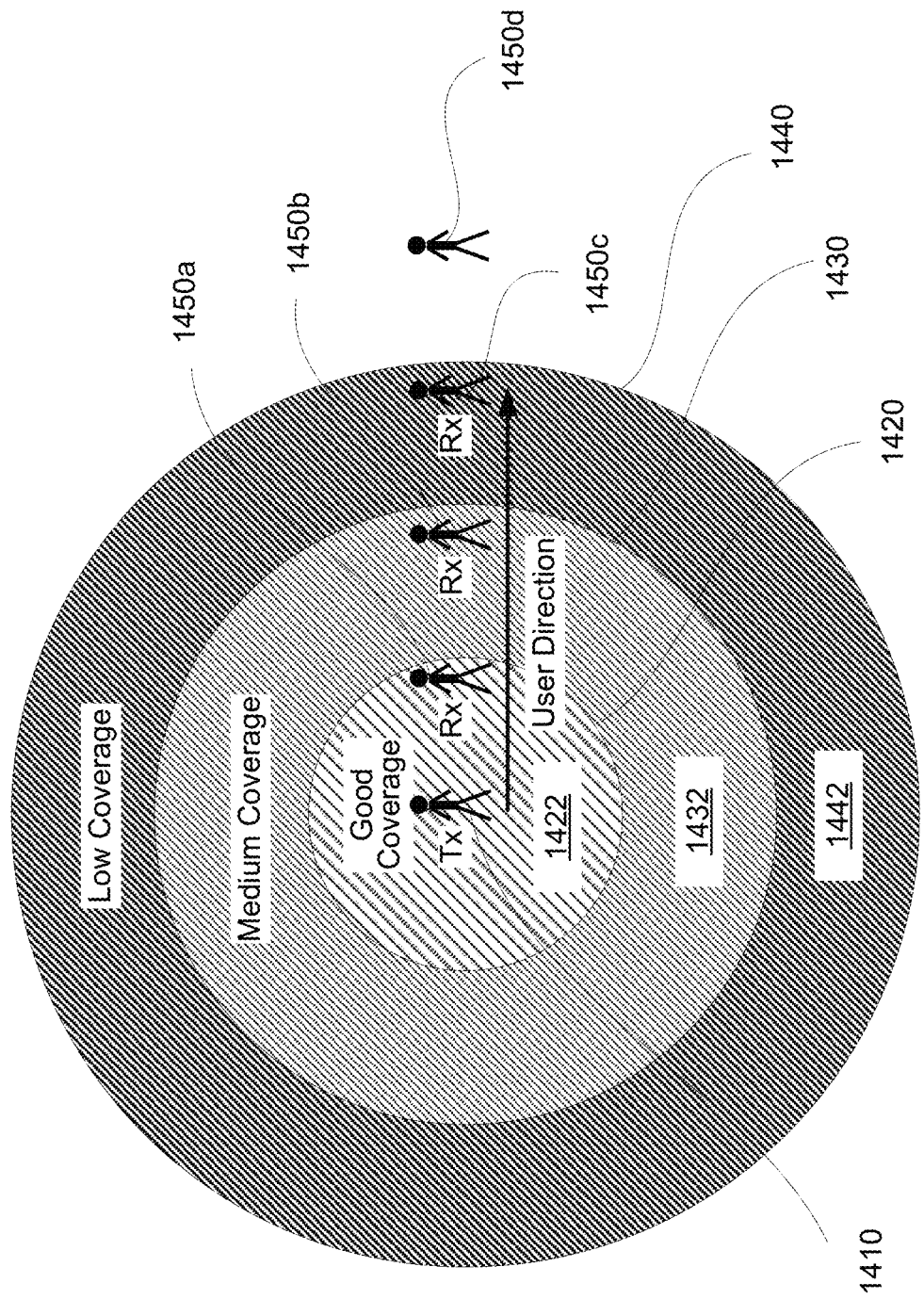
FIG. 14 illustrates different example coverage scenarios of a D2D communication according to some embodiments.

FIG. 14 illustrates different coverage scenarios of a D2D communication. Receiving devices Rx 1450a located within a first region 1422 within a first circle 1420 centered at the location of the transmitting device Tx 1410 may have relatively good coverage, as the distance from the transmitting device Tx 1410 is not so large and the path loss may be relatively small. Receiving devices Rx 1450b located in a second region 1432 outside the first region 1422 and within a second circle 1430 may have moderate coverage, as the distance from the transmitting device Tx 1410 is increased as compared to the first region 1422. Receiving devices Rx 1450c located in a third region 1442 outside the second region 1432 and within a third circle 1440 may have low coverage, as the distance from the transmitting device Tx 1410 is further increased. Receiving devices Rx 1450d located outside the third circle 1440 may have poor or no coverage, as the path loss may be so great that the received signal level may be below the dynamic range of the receiving devices Rx 1450d.

In low coverage conditions (e.g., in the third region 1442 illustrated in FIG. 14), the SINR may be rather low. Even if the signal level is within the dynamic range of a receiving device Rx 1450, there may be a higher probability that a transport block is not decoded correctly even after repeated transmissions. In conventional methods, the transmitting device Tx 1410 may re-transmit the transport block with the same transport block size several more times (e.g., 4 or more times) before dropping it. Therefore, if the transport block is not decoded correctly after repeated transmissions, a receiving device Rx 1450 may fail to receive the data.

According to some embodiments, an adaptive MCS may be used depending on the coverage conditions. For example, after receiving one or more successive negative acknowledgement (NACK) messages, a lower MCS may be used for subsequent re-transmissions. This may help improve the reliability of the D2D communication and reduce failure rates in low coverage conditions.

B. Operation of D2D Communication

Figure 15:
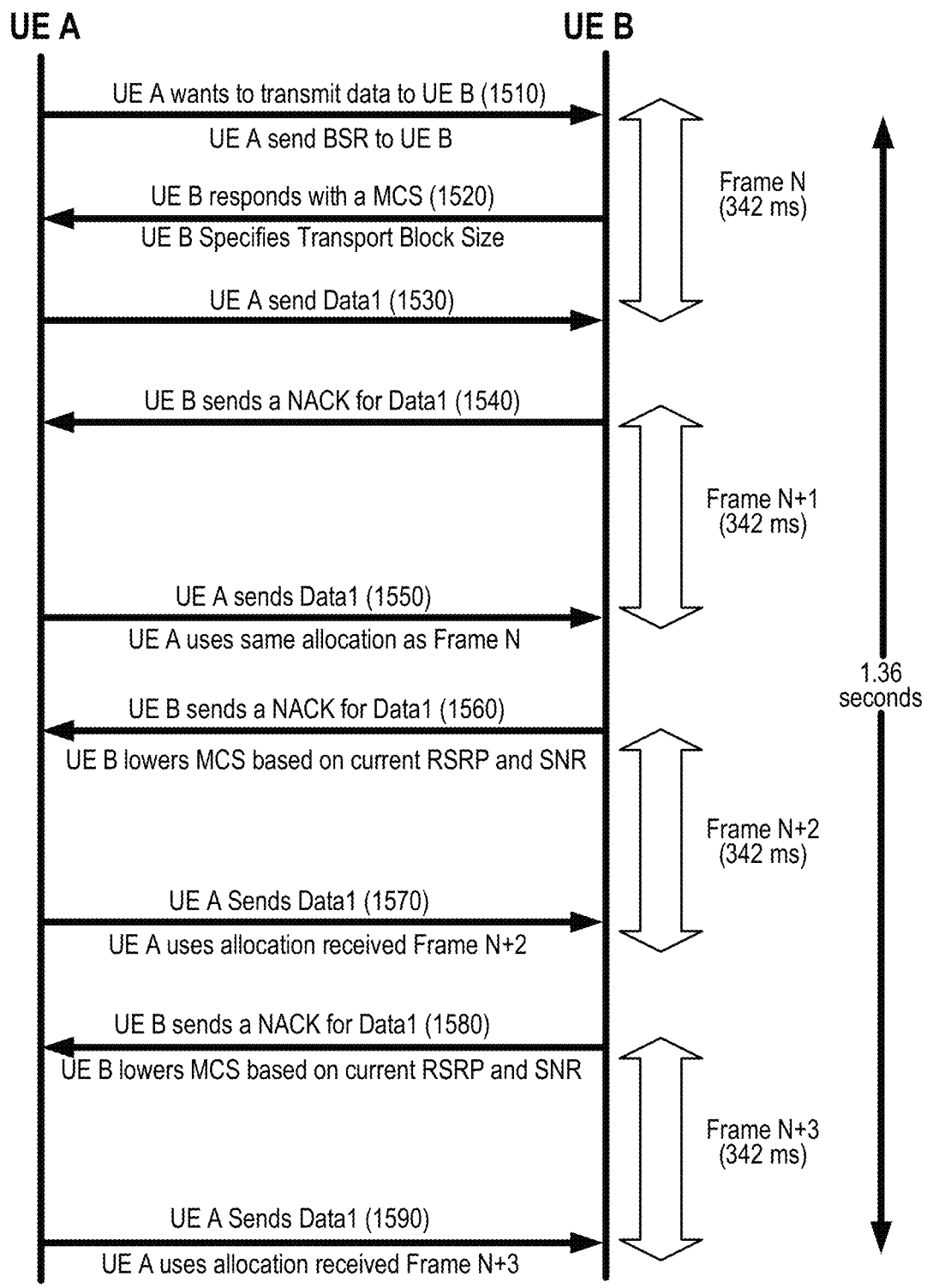
FIG. 15 shows a diagram illustrating an example operation of a D2D communication between a first user equipment (UE A) and a second user equipment (UE B) using adaptive MCS according to some embodiments.

FIG. 15 shows a diagram illustrating operation of a D2D communication between a first user equipment (UE A) and a second user equipment (UE B) using adaptive MCS according to some embodiments.

At 1510, in a first frame (e.g., frame N), UE A may send an advertisement packet to UE B requesting transmission of data to UE B. UE A may also send a buffer status report (BSR) to UE B. The BSR may provide information about the amount of data available for transmission.

At 1520, in response to receiving the advertisement packet from UE A, UE B may send UE A a first MCS and specify a first transport block size.

At 1530, UE A may send first data (data 1) to UE B, using the first MCS and the first transport block size as provided by UE B.

At 1540, in a next frame (e.g., frame N+1), UE B may send a NACK message to UE A indicating that the first data was not correctly decoded.

At 1550, UE A may resend the first data to UE B, again using the first MCS and the first transport block size as provided by UE B.

At 1560, in a next frame (e.g., frame N+2), UE B may send a second NACK to UE A indicating that the first data is still not correctly decoded. UE B may also send UE A a second MCS that is lower than the first MCS, and specify a second transport block size that is smaller than the first transport block size. For example, the first MCS may have a value of 4 (e.g., corresponding to 16 QAM modulation and ¾ coding rate), and the second MCS may have a value of 2 (e.g., corresponding to QPSK modulation and ¾ coding rate). In some embodiments, the second MCS may be determined based on the current reference signal received quality (RSRQ) and SINR.

At 1570, UE A may resend the first data to UE B, using the second MCS and the second transport block size as provided by UE B in this frame.

At 1580, in a next frame (e.g., frame N+3), UE B may send a third NACK to UE A, and a third MCS that is lower than the second MCS based on the current RSRQ and SINR. For example, the third MCS may have a value of 1 (e.g., corresponding to QPSK modulation and ½ coding rate). UE B may also send a third transport block size.

At 1590, UE A may resend the first data to UE B using the third MCS and the third transport block size as provided by UE B in this frame.

According to some embodiments, this process may be repeated for a number of times until the first data is correctly decoded by UE B. According to some other embodiments, UE A may drop the first data after a pre-determined number of failed attempts.

It should be understood that the exemplary procedure illustrated in FIG. 15 is for illustration purposes only. Many variations are possible. For example, UE B may lower the MCS after only one failed decoding attempt, or after three failed decoding attempts.

In some embodiments, in response to receiving one or more NACKs from UE B, UE A may increase the transmit power, so as to increase the RSRP and SINR at UE B.

C. Method of D2D Communication

Figure 16:
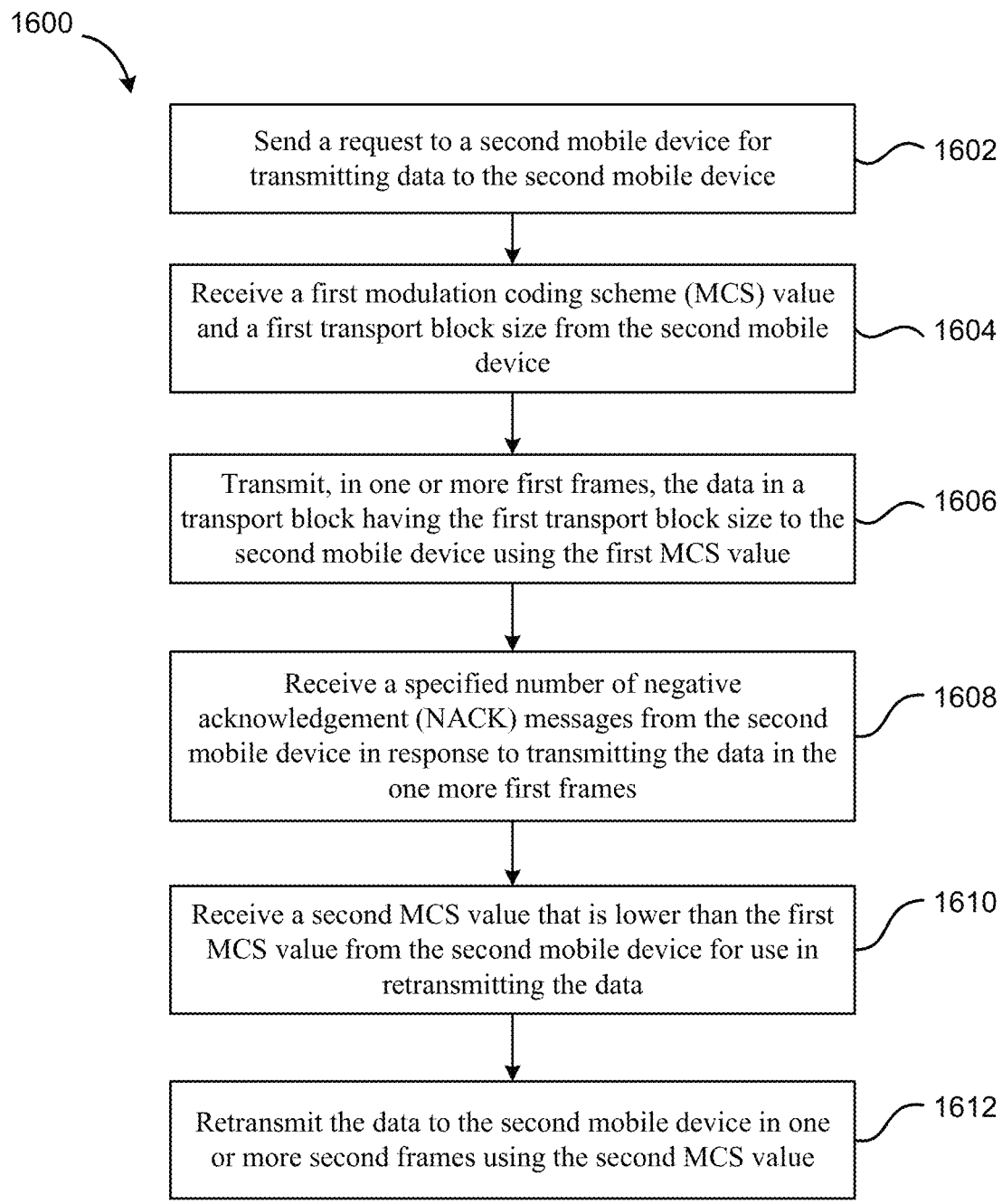
FIG. 16 is a flowchart illustrating an example method of D2D communication according to some embodiments.

FIG. 16 is a flowchart illustrating a method of D2D communication according to some embodiments.

At 1602, a primary mobile device sends a request to a second mobile device for transmitting data to the second mobile device.

At 1604, the primary mobile device receives a first modulation coding scheme (MCS) value and a first transport block size from the second mobile device.

At 1606, the primary mobile device transmits, in one or more first frames, the data in a transport block having the first transport block size to the second mobile device using the first MCS value.

At 1608, the primary mobile device receives a specified number of negative acknowledgement (NACK) messages from the second mobile device in response to transmitting the data in the one more first frames. For example, the specified number of NACK messages may include two NACK messages. In some embodiments, the specified number of NACK messages may include one or more than two NACK messages.

At 1610, the primary mobile device receives a second MCS value that is lower than the first MCS value from the second mobile device for use in retransmitting the data.

At 1612, the primary mobile device retransmits the data to the second mobile device in one or more second frames using the second MCS value. By lowering the MCS value, the probability that the data will be decoded correctly may be increased, perhaps at the expense of a slower data rate.

It should be appreciated that the specific steps illustrated in FIG. 16 provide a particular method of D2D communication according to some embodiments. Other sequences of steps may also be performed according to alternative embodiments. For example, alternative embodiments of the present disclosure may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

IV. Example Device

Figure 17:
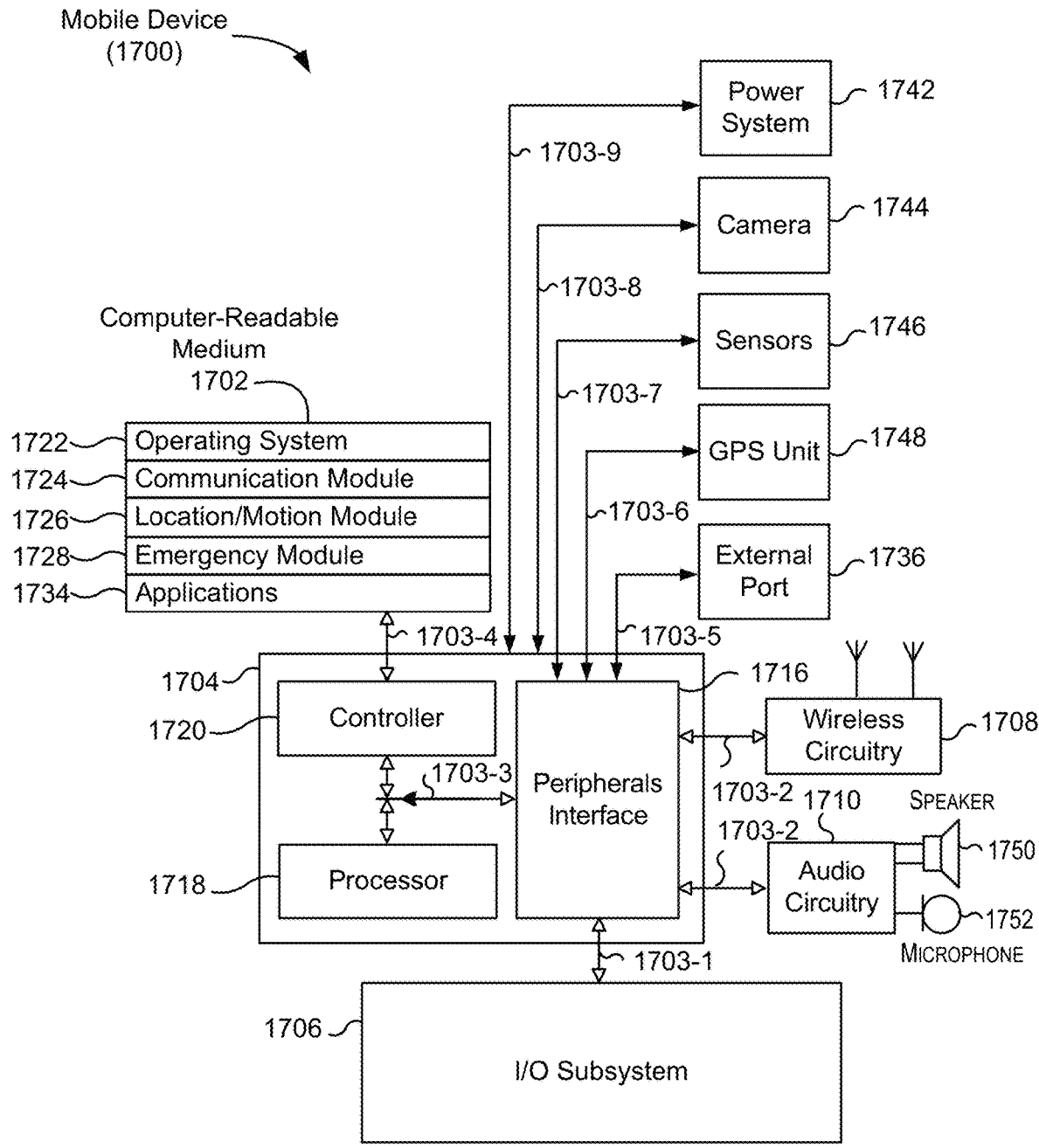
FIG. 17 is a block diagram of an example device, which may be a mobile device according to some embodiments.

FIG. 17 is a block diagram of an example device 1700, which may be a mobile device. Device 1700 generally includes computer-readable medium 1702, a processing system 1704, an Input/Output (I/O) subsystem 1706, wireless circuitry 1708, and audio circuitry 1710 including speaker 1750 and microphone 1752. These components may be coupled by one or more communication buses or signal lines 1703. Device 1700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 17 is only one example of an architecture for device 1700, and that device 1700 can have more or fewer components than shown, or a different configuration of components. The various components shown in FIG. 17 can be implemented in hardware, software, or a combination of both hardware and software, including one or more signal processing and/or application specific integrated circuits.

Wireless circuitry 1708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1708 can use various protocols, e.g., as described herein. For example, wireless circuitry 1708 can have one component for one wireless protocol (e.g., Bluetooth®) and a separate component for another wireless protocol (e.g., UWB). Different antennas can be used for the different protocols.

Wireless circuitry 1708 is coupled to processing system 1704 via peripherals interface 1716. Interface 1716 can include conventional components for establishing and maintaining communication between peripherals and processing system 1704. Voice and data information received by wireless circuitry 1708 (e.g., in speech recognition or voice command applications) is sent to one or more processors 1718 via peripherals interface 1716. One or more processors 1718 are configurable to process various data formats for one or more application programs 1734 stored on medium 1702.

Peripherals interface 1716 couple the input and output peripherals of the device to processor 1718 and computer-readable medium 1702. One or more processors 1718 communicate with computer-readable medium 1702 via a controller 1720. Computer-readable medium 1702 can be any device or medium that can store code and/or data for use by one or more processors 1718. Medium 1702 can include a memory hierarchy, including cache, main memory and secondary memory.

Device 1700 also includes a power system 1742 for powering the various hardware components. Power system 1742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1700 includes a camera 1744. In some embodiments, device 1700 includes sensors 1746. Sensors 1746 can include accelerometers, compasses, gyrometers, pressure sensors, audio sensors, light sensors, barometers, and the like. Sensors 1746 can be used to sense location aspects, such as auditory or light signatures of a location.

In some embodiments, device 1700 can include a GPS receiver, sometimes referred to as a GPS unit 1748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1718 run various software components stored in medium 1702 to perform various functions for device 1700. In some embodiments, the software components include an operating system 1722, a communication module (or set of instructions) 1724, a location module (or set of instructions) 1726, an emergency module 1728 that is used sending and receiving emergency messages as described herein, and other applications (or set of instructions) 1734.

Operating system 1722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1724 facilitates communication with other devices over one or more external ports 1736 or via wireless circuitry 1708 and includes various software components for handling data received from wireless circuitry 1708 and/or external port 1736. External port 1736 (e.g., USB, FireWire, Lightning connector, 60-pin connector, etc.) is adapted for coupling directly to other devices or indirectly over a network (e.g., the Internet, wireless LAN, etc.).

Location/motion module 1726 can assist in determining the current position (e.g., coordinates or other geographic location identifiers) and motion of device 1700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1726 receives data from GPS unit 1748 and analyzes the signals to determine the current position of the mobile device. In some embodiments, location/motion module 1726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1708 and is passed to location/motion module 1726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1700 based on the position coordinates of the corresponding transmitters. Regardless of the specific location technology used, location/motion module 1726 receives information from which a location fix can be derived, interprets that information, and returns location information, such as geographic coordinates, latitude/longitude, or other location fix data.

Emergency module 1728 can send/receive emergency messages to/from other mobile devices as disclosed herein. Emergency module 1728 can be, e.g., connected to wireless circuitry 1708. Emergency module 1728 can also send/receive acknowledgement (ACK) messages to/from other mobile devices as disclosed herein.

The one or more applications programs 1734 on the mobile device can include any applications installed on the device 1700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1706 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1706 can include a display and user input devices such as a keyboard, mouse, and/or track pad. In some embodiments, I/O subsystem 1706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned herein are incorporated by reference in their entirety for all purposes. None is admitted to be prior art.

What is claimed is:

1. A method of sending emergency messages via device-to-device (D2D) communication, the method comprising performing, by a first mobile device:
    broadcasting an emergency message, via D2D communication, in a first plurality of consecutive frames at a first rate;
    receiving, via D2D communication, a first acknowledgement (ACK) message from one of a plurality of second mobile devices, the first ACK message indicating that the one of the plurality of second mobile devices received the emergency message from the first mobile device; and
    in response to receiving the first ACK message, broadcasting the emergency message, via D2D communication, in a second plurality of consecutive frames subsequent to the first plurality of consecutive frames at a second rate that is less than the first rate.

2. The method of claim 1, wherein broadcasting the emergency message at the first rate comprises broadcasting the emergency message in every frame of the first plurality of consecutive frames.

3. The method of claim 2, wherein broadcasting the emergency message at the second rate comprises broadcasting the emergency message in every other frame of the second plurality of consecutive frames.

4. The method of claim 2, wherein broadcasting the emergency message at the second rate comprises broadcasting the emergency message in one out of every three consecutive frames of the second plurality of consecutive frames.

5. The method of claim 1, further comprising:
    receiving, via D2D communication, a second ACK message from another one of the plurality of second mobile devices; and
    in response to receiving the second ACK message, broadcasting the emergency message, via D2D communication, in a third plurality of consecutive frames subsequent to the second plurality of consecutive frames at a third rate that is less than the second rate.

6. The method of claim 1, wherein the first ACK message comprises fewer bits than a full payload capacity.

7. The method of claim 6, wherein the first ACK message comprises 1 bit, and the full payload capacity is 32 bits.

8. The method of claim 1, wherein the first ACK message comprises a Zadoff-Chu (ZC) sequence.

9. A non-transitory computer readable medium storing instructions that, when executed by one or more processors of a first mobile device, control the first mobile device to send emergency messages via device-to-device (D2D) communication, the instructions comprising:
    broadcasting an emergency message, via D2D communication, in a first plurality of consecutive frames at a first rate;
    receiving, via D2D communication, a first acknowledgement (ACK) message from at least one of a plurality of second mobile devices, the first ACK message indicating that the one of the plurality of second mobile devices received the emergency message from the first mobile device; and in response to receiving the first ACK message, broadcasting the emergency message, via D2D communication, in a second plurality of consecutive frames subsequent to the first plurality of frames at a second rate that is less than the first rate.

10. The non-transitory computer readable medium of claim 9, wherein broadcasting the emergency message at the first rate comprises broadcasting the emergency message in every frame of the first plurality of consecutive frames, and broadcasting the emergency message at the second rate comprises broadcasting the emergency message in every other frame of the second plurality of consecutive frames.

11. The non-transitory computer readable medium of claim 9, wherein the instructions further comprises:
  receiving, via D2D communication, a second ACK message from another one of the plurality of second mobile devices; and
  in response to receiving the second ACK message, broadcasting the emergency message, via D2D communication, in a third plurality of consecutive frames subsequent to the second plurality of consecutive frames at a third rate that is less than the second rate.

12. The non-transitory computer readable medium of claim 9, wherein the first ACK message comprises fewer bits than a full payload capacity.

13. The non-transitory computer readable medium of claim 12, wherein the first ACK message comprises 1 bit, and the full payload capacity is 32 bits.

14. The non-transitory computer readable medium of claim 9, wherein the first ACK message comprises a Zadoff-Chu (ZC) sequence.

15. A mobile device for sending emergency messages via device-to-device (D2D) communication, the mobile device comprising:
  one or more processors configured to perform:
    broadcasting an emergency message, via D2D communication, in a first plurality of consecutive frames at a first rate;
    receiving, via D2D communication, a first acknowledgement (ACK) message from at least one of a plurality of second mobile devices, the first ACK message indicating that the at least one of the plurality of second mobile devices received the emergency message from the mobile device; and
    in response to receiving the first ACK message, broadcasting the emergency message, via D2D communication, in a second plurality of consecutive frames subsequent to the first plurality of consecutive frames at a second rate that is less than the first rate.

16. The mobile device of claim 15, wherein broadcasting the emergency message at the first rate comprises broadcasting the emergency message in every frame of the first plurality of consecutive frames, and broadcasting the emergency message at the second rate comprises broadcasting the emergency message in every other frame of the second plurality of consecutive frames.

17. The mobile device of claim 15, wherein the one or more processors are further configured to perform:
  receiving, via D2D communication, a second ACK message from another one of the plurality of second mobile devices; and
  in response to receiving the second ACK message, broadcasting the emergency message, via D2D communication, in a third plurality of consecutive frames subsequent to the second plurality of consecutive frames at a third rate that is less than the second rate.

18. The mobile device of claim 15, wherein the first ACK message comprises fewer bits than a full payload capacity.

19. The mobile device of claim 18, wherein the first ACK message comprises 1 bit, and the full payload capacity is 32 bits.

20. The mobile device of claim 15, wherein the first ACK message comprises a Zadoff-Chu (ZC) sequence.

* * * * *